United States Patent
Tohyama et al.

(10) Patent No.: US 8,009,282 B2
(45) Date of Patent: Aug. 30, 2011

(54) ATTACHMENT ANGLE MEASURING DEVICE AND ATTACHMENT ANGLE MEASURING METHOD

(75) Inventors: Shinji Tohyama, Toyota (JP); Yuichiro Oka, Nishikamo-gun (JP); Koji Tomida, Okazaki (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 309 days.

(21) Appl. No.: 12/520,011

(22) PCT Filed: Oct. 10, 2008

(86) PCT No.: PCT/JP2008/068427
§ 371 (c)(1),
(2), (4) Date: Jun. 18, 2009

(87) PCT Pub. No.: WO2009/057434
PCT Pub. Date: May 7, 2009

(65) Prior Publication Data
US 2010/0060884 A1    Mar. 11, 2010

(30) Foreign Application Priority Data
Oct. 31, 2007  (JP) ................................. 2007-284290

(51) Int. Cl.
*G01B 11/26* (2006.01)
*G01C 1/00* (2006.01)
*G01C 1/06* (2006.01)

(52) U.S. Cl. .......... 356/138; 356/139; 451/364; 73/1.11
(58) Field of Classification Search .................. 356/138, 356/139; 451/364; 370/389; 73/1.1
See application file for complete search history.

(56) References Cited

U.S. PATENT DOCUMENTS

| | | | | |
|---|---|---|---|---|
| 1,647,518 A | * | 11/1927 | Hawley, Jr. | .................... 267/186 |
| 2,292,968 A | * | 8/1942 | Peters | ............................. 33/228 |
| 4,838,574 A | * | 6/1989 | Baraszu | ..................... 280/5.515 |
| 5,488,471 A | * | 1/1996 | McClenahan et al. | ... 356/139.09 |
| 5,488,472 A | * | 1/1996 | January | .................... 356/139.09 |
| 5,519,489 A | * | 5/1996 | McClenahan et al. | ... 356/139.09 |

(Continued)

FOREIGN PATENT DOCUMENTS

JP        02-171608 A        7/1990

(Continued)

*Primary Examiner* — Thomas Tarcza
*Assistant Examiner* — Antoine Bedard
(74) *Attorney, Agent, or Firm* — Kenyon & Kenyon LLP

(57) ABSTRACT

The present invention provides an attachment angle measuring device and an attachment angle measuring method which realize accurate measurement of attachment angle between an axle carrier and an absorber. An attachment angle measuring device measures an attachment angle $\theta$ between an axle carrier and an absorber as in the following. A slit light is projected to a first reflection position on an outer peripheral surface of an absorber rod and a reflected light from the first reflection position is received. A slit light is projected to a second reflection position on the outer peripheral surface of the absorber rod different from the first reflection position and a reflected light from the second reflection position is received. A first optical path distance between a projection start position of the slit light and the first reflection position is calculated based on the reflected light. A second optical path distance between the projection start position of the slit light and the second reflection position is calculated based on the reflected light. Based on the first optical path distance and the second optical path distance, attachment angle $\theta$ is calculated.

12 Claims, 5 Drawing Sheets

U.S. PATENT DOCUMENTS

| | | | | |
|---|---|---|---|---|
| 5,579,108 A * | 11/1996 | See | | 356/450 |
| 5,636,018 A * | 6/1997 | Hirano et al. | | 356/248 |
| 5,737,073 A * | 4/1998 | Wente et al. | | 356/139.09 |
| 5,815,257 A * | 9/1998 | Haas | | 356/155 |
| 5,821,434 A * | 10/1998 | Halliday | | 73/862.541 |
| 5,933,240 A * | 8/1999 | Jurca | | 356/623 |
| 6,308,962 B1 * | 10/2001 | Ishikawa et al. | | 280/5.514 |
| 6,412,183 B1 * | 7/2002 | Uno | | 33/203.12 |
| 6,646,742 B1 | 11/2003 | Gangstead et al. | | 356/342 |
| 6,657,711 B1 * | 12/2003 | Kitagawa et al. | | 356/155 |
| 6,674,521 B1 * | 1/2004 | Segall et al. | | 356/150 |
| 6,799,376 B1 * | 10/2004 | Voeller et al. | | 33/203.18 |
| 7,076,351 B2 * | 7/2006 | Hamilton et al. | | 701/37 |
| 7,336,350 B2 * | 2/2008 | Dorrance et al. | | 356/139.09 |
| 7,610,126 B2 * | 10/2009 | Spanesi | | 701/29 |
| 2005/0099617 A1 * | 5/2005 | Ohtomo et al. | | 356/11 |
| 2007/0127011 A1 * | 6/2007 | Loen | | 356/138 |
| 2010/0060885 A1 * | 3/2010 | Nobis et al. | | 356/139.09 |
| 2010/0235048 A1 * | 9/2010 | Richerzhagen et al. | | 701/41 |

FOREIGN PATENT DOCUMENTS

| | | |
|---|---|---|
| JP | 05-141929 A | 6/1993 |
| JP | 2001-153757 A | 6/2001 |
| JP | 2001-221627 A | 8/2001 |
| JP | 2005-053636 A | 3/2005 |
| JP | 2007-085760 A | 4/2007 |

* cited by examiner (a)

(b)

ATTACHMENT ANGLE MEASURING DEVICE AND ATTACHMENT ANGLE MEASURING METHOD

This is a 371 national phase application of PCT/JP2008/068427 filed 10 Oct. 2008, claiming priority to Japanese Patent Application No. 2007-284290filed 31 Oct. 2007, the contents of which are incorporated herein by reference.

TECHNICAL FIELD

The present invention relates to an art of measurement of an attachment angle between an axle carrier and an absorber of a vehicle such as a car.

BACKGROUND ART

Conventionally, there is known a device described in the Japanese Patent Laid Open Gazette 2001-221627 as a device measuring a tilt angle of a measuring object. With regard to the device described in the Japanese Patent Laid Open Gazette 2001-221627, an angle gauge head is pivotally supported rotatably and the rotation angle of the angle gauge head is detected by a sensor. The shape of the angle gauge head is like a circle cut off a part thereof so as to have a major arc, and the angle gauge head touches the measuring object at its chord.

As a device measuring an attachment angle between an axle carrier and an absorber (for example, a camber angle), there is known an attachment angle measuring device 500 shown in FIG. 5.

The attachment angle measuring device 500 measures an attachment angle between an axle carrier 10 and an absorber 20, and comprises a carrier clamp 510 and a magnet scale 520.

The axle carrier 10 comprises an axle hub 11 and an axle housing 12, and supports a wheel (not shown) rotatably.

The axle hub 11 is fixed to the wheel. The axle housing 12 pivotally supports the axle hub 11 rotatably. An attachment bracket 12a is formed in the axle housing 12, and two holes respectively penetrated by bolts 31 and 32 are formed in the attachment bracket 12a.

The absorber 20 comprises an absorber main body 21 and an absorber rod 22, and absorbs shock transmitted from the wheel to a main body of a vehicle.

The absorber main body 21 is cylindrical and one of ends (lower end) thereof is closed. An attachment bracket 21a is formed at the end (lower end) of the absorber main body 21. Two holes into which the bolts 31 and 32 are respectively inserted are formed in the attachment bracket 21a.

The attachment bracket 21a of the absorber main body 21 and the attachment bracket 12a of the axle housing 12 are superimposed on each other so that the two holes formed in the attachment bracket 21a are respectively in agreement with the two holes formed in the attachment bracket 12a. The bolts 31 and 32 are respectively inserted into the holes and nuts (not shown) are screwed onto the bolts 31 and 32 so as to attach the absorber 20 to the axle carrier 10.

The absorber rod 22 is round bar-like shaped and slidably inserted into the absorber main body 21. A piston (not shown) is provided at one of ends (lower end) of the absorber rod 22 and is slid while touching an inner peripheral surface of the absorber main body 21. The other end (upper end) of the absorber rod 22 is projected upward from the absorber main body 21. The middle portion of the absorber rod 22 is sealingly and slidably supported by a through-hole formed in a lid 21b screwed onto the other end (upper end) of the absorber main body 21.

The inner space of the absorber main body 21 is filled with pressure oil. When the absorber rod 22 is slid about the absorber main body 21, pressure oil is moved between the portion of the inner space of the absorber main body 21 upper than the piston and the portion thereof lower than the piston through a hole formed in one of ends (lower end) of the absorber rod 22. By viscosity resistance of pressure oil at the time of passing through the hole formed in the piston, the absorber 20 absorbs shock transmitted from the wheel to the main body of the vehicle.

The carrier clamp 510 fixes the axle carrier 10 at the posture at which an axis 1 of the axle carrier 10 is in parallel to a horizontal plane (the posture similar to the final state of attached to the main body of the vehicle.

The carrier clamp 510 comprises a claw 511 and a claw 512. The distance (interval) between the claw 511 and the claw 512 is varied by operation of a hydraulic actuator.

When the axle carrier 10 is arranged between the claw 511 and the claw 512 and the distance between the claw 511 and the claw 512 is reduced, the axle carrier 10 is pinched by the claws 511 and 512.

The magnet scale 520 comprises a frame 521, a slide rod 522, a spring 523, a magnetic tape 524 and a magnetic flux response detecting head 525.

The frame 521 is a main structure of the magnet scale 520 and is fixed to another structure (not shown).

The slide rod 522 is bar-like shaped and slidably supported by the frame 521. A touching head 522a is provided at one of ends of the slide rod 522. The touching head 522a is substantially conical and a bottom surface of the touching head 522a is fixed to one of end surfaces of the slide rod 522. The diameter of the bottom surface of the touching head 522a is longer than that of the slide rod 522. A top of the touching head 522a touches an outer peripheral surface of the absorber main body 21.

The spring 523 is a helical spring engaged with the outside of the slide rod 522. One of ends of the spring 523 touches the bottom surface of the touching head 522a, and the other end of the spring 523 touches the frame 521. Therefore, the touching head 522a is biased toward the absorber main body 21 by the elastic force of the spring 523.

The magnetic tape 524 is a tape of a ferromagnetic substance stuck on an outer peripheral surface of the slide rod 522, and has memory so as to arrange magnetic signals (north poles and south poles) mutually at a fixed cycle in the slide direction (longer direction) of the slide rod 522.

The magnetic flux response detecting head 525 is disposed so as to face the magnetic tape 524 stuck on the outer peripheral surface of the slide rod 522. The magnetic flux response detecting head 525 comprises an exciting coil and a detecting coil. Alternating current flows in the exciting coil of the magnetic flux response detecting head 525 so as to excite the exciting coil.

When the touching head 522a touches the outer peripheral surface of the absorber main body 21 and the slide rod 522 is slid oppositely to the biasing force of the spring 523, the position of the magnetic tape 524 facing the magnetic flux response detecting head 525 is varied and the magnitude of the magnetic field around the exciting coil of the magnetic flux response detecting head 525 is varied. The detecting coil of the magnetic flux response detecting head 525 detects the variation of the magnitude of the magnetic field around the exciting coil as induced voltage so as to detect the amount of slide of the slide rod 522.

The attachment angle measuring device 500 calculates the attachment angle between the axle carrier 10 and the absorber 20 based on the amount of slide of the slide rod 522 detected by the magnet scale 520.

However, with regard to the attachment angle measuring device 500, it is difficult to measure the measurement of the attachment angle between the axle carrier 10 and the absorber 20 accurately. That is because following reason.

A piston provided at one of ends of the absorber rod 22 slidably touches the inner peripheral surface of the absorber main body 21. Therefore, the processing of the inner peripheral surface of the absorber main body 21 is accurate.

On the other hand, any member does not slidably touch the outer peripheral surface of the absorber main body 21. Therefore, the processing of the outer peripheral surface of the absorber main body 21 is not more accurate than that of the inner peripheral surface of the absorber main body 21, and dimensions of the processing of the outer peripheral surface of the absorber main body 21 are not uniform individually.

Accordingly, with regard to the attachment angle measuring device 500, the touching head 522a touches the outer peripheral surface of the absorber main body 21 whose processing is not accurate relatively, whereby it is difficult to measure the measurement of the attachment angle between the axle carrier 10 and the absorber 20 accurately.

A bracket or the like, which fixes piping (a flexible hose) supplying pressure oil so as to actuate a brake, is welded to the outer peripheral surface of the absorber main body 21. The attachment position of such a bracket is different for the type of the vehicle. Then, depending on the type of the vehicle, the bracket may interfere with the magnet scale 520. When weld spatter sticks on the outer peripheral surface of the absorber main body 21 at the time of welding the bracket, the weld spatter may touch the touching head 522a so as to reduce the accuracy of the measurement.

For solving the above problems, it is conceivable to make the touching head 522a touch an outer peripheral surface of the absorber rod 22 whose processing is accurate because the outer peripheral surface of the absorber rod 22 is slidably and liquid-sealingly supported by the through-hole formed in the lid 21b.

The touching head 522a of the magnet scale 520 pushes the absorber rod 22 laterally with certain force. Then, especially in the case that the projection amount of the absorber rod 22 from the absorber main body 21 is large, the absorber rod 22 may be tilted against the absorber main body 21 about the point at which the absorber rod 22 touches the lid 21b. Accordingly, it is difficult to measure the measurement of the attachment angle between the axle carrier 10 and the absorber 20 accurately.

The sectional shape of the outer peripheral surface of the absorber rod 22 is a circle whose diameter is relatively small. Accordingly, it is difficult to make a peaked tip of the touching head 522a touch accurately a predetermined position on the outer peripheral surface of the absorber rod 22 (the position at which the axis of the slide rod 522 intersects the axis of the absorber rod 22), whereby works incidental to the fixation of the axle carrier 10 such as a positioning work are troublesome.

Therefore, at the process of attaching the absorber 20 to the axle carrier 10, it is difficult to adopt the attachment angle measuring device 500 to total inspection.

Furthermore, generally in the contact type measurement, increase of the number of measurement causes abrasion of the tip of the touching head 522a so as to reduce the accuracy of measurement.

DISCLOSURE OF INVENTION

Problems to be Solved by the Invention

The purpose of the present invention is to provide an attachment angle measuring device and an attachment angle measuring method which realize accurate measurement of attachment angle between an axle carrier and an absorber.

Means for Solving the Problems

An attachment angle measuring device, which is the first mode of the present invention, measuring an attachment angle between an axle carrier rotatably supporting a wheel and an absorber comprising an absorber main body attached to the axle carrier and an absorber rod slidably inserted into the absorber main body, comprises:

a first light projecting part projecting a light to a first reflection position on an outer peripheral surface of the absorber rod when the axle carrier is fixed at a predetermined measurement position, the absorber is attached to the axle carrier and the absorber rod does not contact any member except the axle carrier;

a first light receiving part receiving the reflected light from the first reflection position;

a second light projecting part projecting a light to a second reflection position difference from the first reflection position on the outer peripheral surface of the absorber rod when the axle carrier is fixed at the predetermined measurement position, the absorber is attached to the axle carrier and the absorber rod does not contact any member except the axle carrier;

a second light receiving part receiving the reflected light from the second reflection position;

a first optical path distance calculating part calculating first optical path distance between the first light projecting part and the first reflection position based on the reflected light received by the first light receiving part;

a second optical path distance calculating part calculating second optical path distance between the second light projecting part and the second reflection position based on the reflected light received by the second light receiving part; and an attachment angle calculation part calculating the attachment angle between the axle carrier and the absorber based on the first optical path distance and the second optical path distance.

Preferably, with regard to the attachment angle measuring device according to the present invention, the first light projecting part and the second light projecting part project a slit light to the absorber rod, the first optical path distance calculating part generates a first profile of the outer peripheral surface of the absorber rod based on the reflected light received by the first light receiving part and regards a point which is the closest to the first light projecting part on the first profile as the first reflection position so as to calculates the first optical path distance, and the second optical path distance calculating part generates a second profile of the outer peripheral surface of the absorber rod based on the reflected light received by the second light receiving part and regards a point which is the closest to the second light projecting part on the second profile as the second reflection position so as to calculates the second optical path distance.

Preferably, with regard to the attachment angle measuring device according to the present invention, the first optical path distance calculating part generates a first correction profile by correcting the first profile as a circular arc or an elliptical arc, and a point which is the closest to the first light projecting part on the first correction profile is regarded as the first reflection position so as to calculate the first optical path distance, and the second optical path distance calculating part generates a second correction profile by correcting the second profile as a circular arc or an elliptical arc, and a point which is the closest to the second light projecting part on the second correction profile is regarded as the second reflection position so as to calculate the second optical path distance.

Preferably, with regard to the attachment angle measuring device according to the present invention, the attachment angle calculation part calculates the attachment angle θ between the axle carrier and the absorber by substituting difference ΔH between distance between the axis of the fixed axle carrier and the first light projecting part and distance between the axis of the fixed axle carrier and the second light projecting part and the first optical path distance L1 and the second optical path distance L2 for a below Numerical Formula 1.

$$\theta = \tan^{-1}\left(\frac{\Delta H}{L2 - L1}\right)$$ [Numerical Formula 1]

Preferably, the attachment angle measuring device according to the present invention comprises an axle carrier fixation part detachably fixing the axle carrier to the measurement position Preferably, the attachment angle measuring device according to the present invention comprises an absorber fixation part detachably fixing the absorber at a position at which the absorber can be attached to the axle carrier fixed by the axle carrier fixation part.

Preferably, with regard to the attachment angle measuring device according to the present invention, the absorber fixation part fixes the absorber at a posture at which the attachment angle between the axle carrier fixed by the axle carrier fixation part and the absorber is within a predetermined angular range.

An attachment angle measuring method, which is the second mode of the present invention, measuring an attachment angle between an axle carrier rotatably supporting a wheel and an absorber comprising an absorber main body attached to the axle carrier and an absorber rod slidably inserted into the absorber main body, comprises:

a fixing process in which the axle carrier to which the absorber is attached is fixed at a measurement position set previously;

a first light projecting and receiving process in which the absorber attached to the axle carrier fixed at the measurement position is kept not contacting anything except the axle carrier, and a light is projected to a first reflection position on an outer peripheral surface of the absorber rod of the absorber and the reflected light from the first reflection position is received;

a second light projecting and receiving process in which the absorber attached to the axle carrier fixed at the measurement position is kept not contacting anything except the axle carrier, and a light is projected to a second reflection position on an outer peripheral surface of the absorber rod of the absorber difference from the first reflection position and the reflected light from the second reflection position is received;

a first optical path distance calculating process in which first optical path distance between the projection start position in the first light projecting and receiving process and the first reflection position based on the reflected light received in the first light projecting and receiving process;

a second optical path distance calculating process in which the second optical path distance between the projection start position in the second light projecting and receiving process and the second reflection position based on the reflected light received in the second light projecting and receiving process; and an attachment angle calculating process in which the attachment angle between the axle carrier and the absorber is calculated based on the first optical path distance and the second optical path distance.

Preferably, with regard to the attachment angle measuring method according to the present invention, in each of the first light projecting and receiving process and the second light projecting and receiving process, a slit light is projected to the absorber rod, in the first optical path distance calculating process, a first profile of the outer peripheral surface of the absorber rod is generated based on the reflected light received in the first light projecting and receiving process and regards a point which is the closest to the projection start position in the first light projecting and receiving process on the first profile as the first reflection position so as to calculates the first optical path distance, and in the second optical path distance calculating process, a second profile 62 of the outer peripheral surface of the absorber rod is generated based on the reflected light received in the second light projecting and receiving process and regards a point which is the closest to the projection start position in the second light projecting and receiving process on the second profile as the second reflection position so as to calculates the second optical path distance.

Preferably, with regard to the attachment angle measuring method according to the present invention, in the first optical path distance calculating process, a first correction profile is generated by correcting the first profile as a circular arc or an elliptical arc, and a point which is the closest to the projection start position in the first light projecting and receiving process on the first correction profile is regarded as the first reflection position so as to calculate the first optical path distance, and in the second optical path distance calculating process, a second correction profile is generated by correcting the second profile as a circular arc or an elliptical arc, and a point which is the closest to the projection start position in the second light projecting and receiving process on the second correction profile is regarded as the second reflection position so as to calculate the second optical path distance.

Preferably, with regard to the attachment angle measuring method according to the present invention, in the attachment angle calculating process, the attachment angle between the axle carrier and the absorber is calculated by substituting difference ΔH between distance between the axis of the axle carrier fixed at the measurement position and the projection start position in the first light projecting and receiving process and distance between the axis of the axle carrier fixed at the measurement position and the projection start position in the second light projecting and receiving process and the first optical path distance L1 and the second optical path distance L2 for a below Numerical Formula 1.

$$\theta = \tan^{-1}\left(\frac{\Delta H}{L2 - L1}\right)$$ [Numerical Formula 1]

Preferably, with regard to the attachment angle measuring method according to the present invention, the fixing process comprises:

an axle carrier fixing process in which the axle carrier is fixed at the measurement position; and an absorber attaching process in which the absorber is attached to the axle carrier fixed at the measurement position in the axle carrier fixing process.

Effect of the Invention

According to the present invention, the attachment angle between the axle carrier and the absorber can be measured accurately.

THE BEST MODE FOR CARRYING OUT THE INVENTION

Explanation will be given on an attachment angle measuring device 100 which is an embodiment of an attachment angle measuring device according to the present invention referring to FIGS. 1 to 3.

Figure 1:
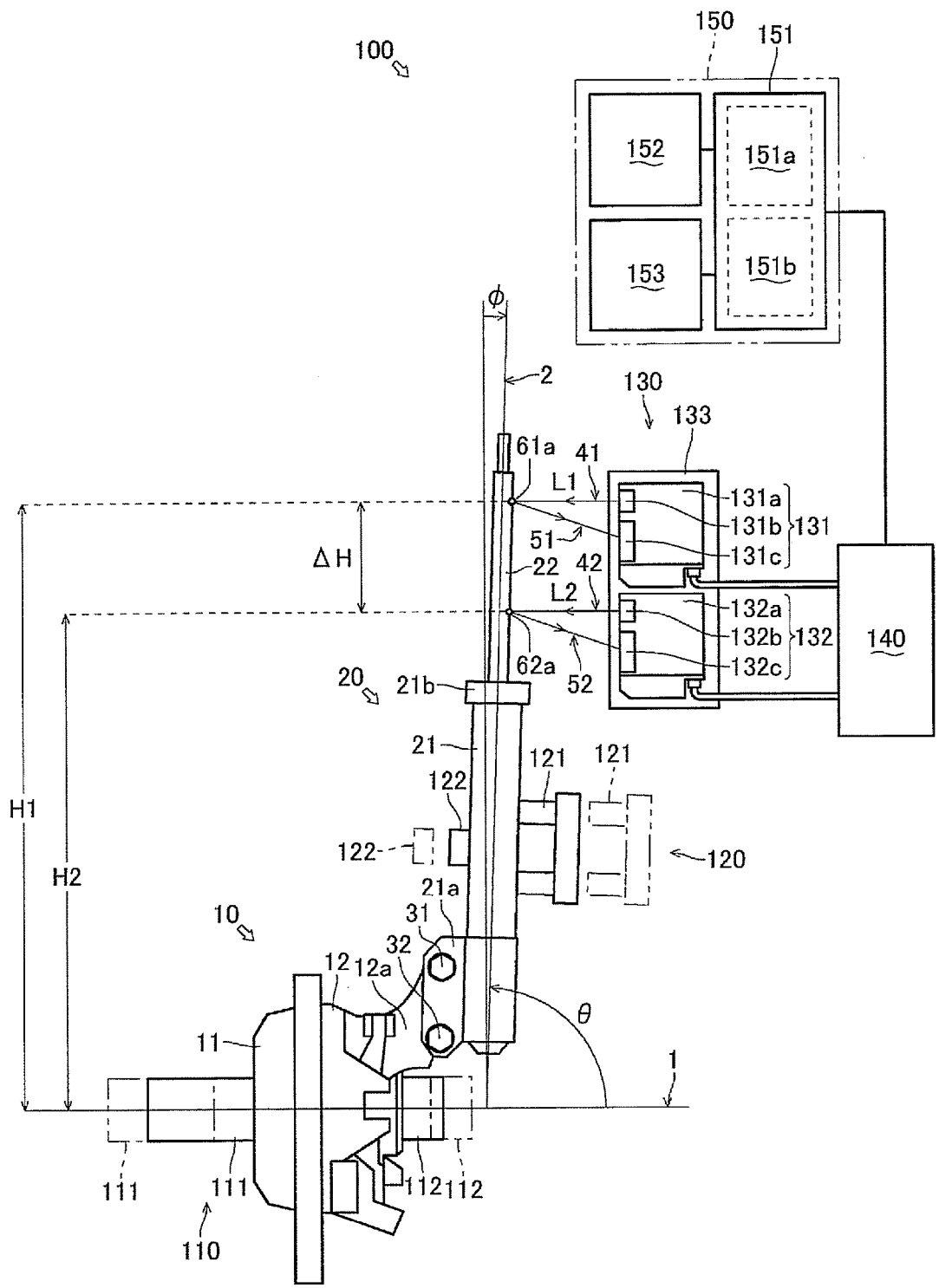
FIG. 1 It is a drawing of an attachment angle measuring device according to the present invention.
Figure 2:
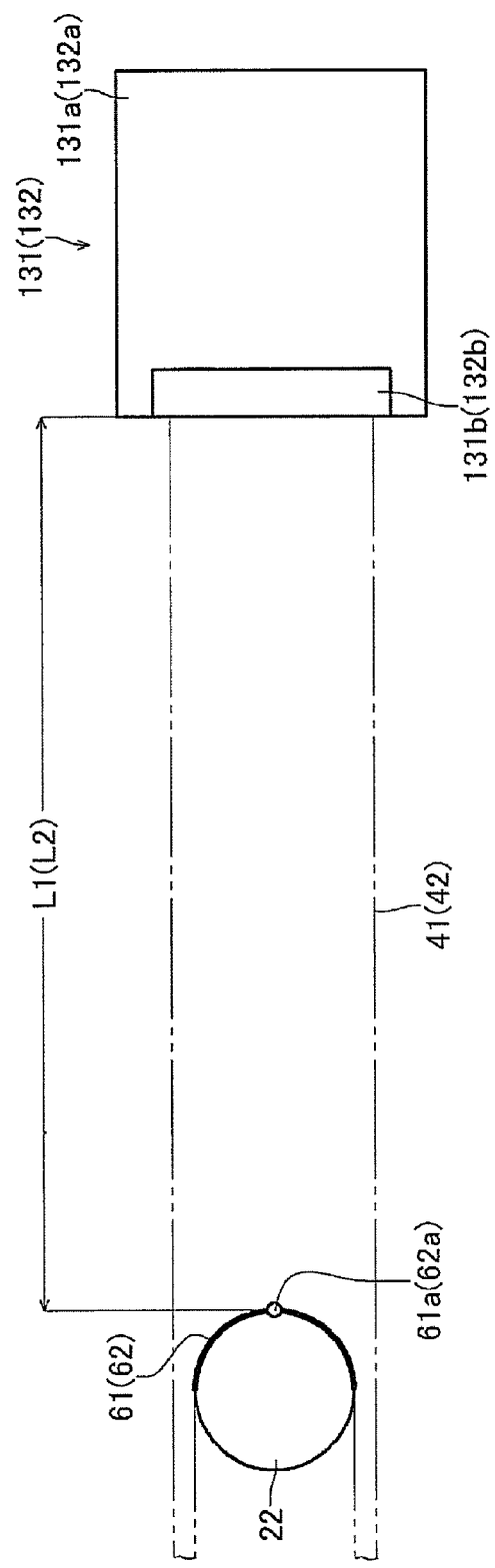
FIG. 2 It is a plan view of positional relation between an absorber rod and first and second illuminants of the attachment angle measuring device according to the present invention.

The attachment angle measuring device 100 measures an attachment angle θ between an axle carrier 10 and an absorber 20 (in this embodiment, an angle between an axis 1 and an axis 2 in FIG. 1).

As shown in FIG. 1, the attachment angle measuring device 100 comprises a carrier clamp 110, an absorber clamp 120, a light projecting and receiving unit 130, an optical path distance calculating unit 140, and an analyzing unit 150.

The axle carrier 10 rotatably supports a wheel (not shown) and comprises an axle hub 11 and an axle housing 12.

The axle hub 11 is fixed to the wheel. The axle housing 12 rotatably supports the axle hub 11. The axle hub 11 is rotated about the axle housing 12 centering on the axis 1.

An attachment bracket 12a is formed in the axle housing 12. Two holes into which bolts 31 and 32 are respectively inserted are formed in the attachment bracket 12a.

The absorber 20 absorbs shock transmitted from the wheel supported by the axle carrier 10 to a main body of a vehicle, and comprises an absorber main body 21 and an absorber rod 22.

The absorber main body 21 is cylindrical and one of ends (lower end) thereof is closed. An attachment bracket 21a is formed at the end (lower end) of the absorber main body 21. Two holes into which the bolts 31 and 32 are respectively inserted are formed in the attachment bracket 21a.

The attachment bracket 21a of the absorber main body 21 and the attachment bracket 12a of the axle housing 12 are superimposed on each other so that the two holes formed in the attachment bracket 21a are respectively in agreement with the two holes formed in the attachment bracket 12a. The bolts 31 and 32 are respectively inserted into the holes and nuts (not shown) are screwed onto the bolts 31 and 32 so as to attach the absorber 20 to the axle carrier 10.

The absorber rod 22 is round-bar-like shaped and slidably inserted into the absorber main body 21. A piston (not shown) is provided at one of ends (lower end) of the absorber rod 22 and is slid while touching an inner peripheral surface of the absorber main body 21. The other end (upper end) of the absorber rod 22 is projected upward from the absorber main body 21. The middle portion of the absorber rod 22 is sealingly and slidably supported by a through-hole formed in a lid 21b screwed onto the other end (upper end) of the absorber main body 21.

The inner space of the absorber main body 21 is filled with pressure oil. When the absorber rod 22 is slid about the absorber main body 21, pressure oil is moved between the portion of the inner space of the absorber main body 21 upper than the piston and the portion thereof lower than the piston through a hole formed in the piston. By viscosity resistance of pressure oil at the time of passing through the hole formed in the piston, the absorber 20 absorbs shock transmitted from the wheel supported by the axle carrier 10 to the main body of the vehicle.

When external force is not applied on the absorber 20, the center line of the absorber main body 21 is in agreement with the center line of the absorber rod 22 (arranged in a straight line) so as to constitute the axis 2. Then, the absorber rod 22 is slid along the longer direction of the axis 2.

The carrier clamp 110 is an embodiment of an axle carrier fixation part according to the present invention and detachably fixes the axle carrier 10 to a predetermined "measurement position".

The "measurement position" in this embodiment is a position to which the axle carrier 10 is fixed when attachment angle θ between the axle carrier 10 and the absorber 20 (attachment angle of the absorber 20 against the axle carrier 10) is measured.

In this embodiment, the measurement position of the axle carrier 10 is in agreement with "a position to which the axle carrier is fixed when the absorber 20 is attached to the axle carrier 10".

The carrier clamp 110 comprises a claw 111 and a claw 112.

The claw 111 touches the axle hub 11. The claw 112 touches the axle housing 12.

The distance (interval) between the claw 111 and the claw 112 is varied by operation of a hydraulic actuator (not shown) (for example, extension or contraction of a hydraulic cylinder).

In the case that the distance between the claw 111 and the claw 112 is long (shown by a two-dot chain line in FIG. 1), when the axle carrier 10 is arranged between the claw 111 and the claw 112 and subsequently the distance between the claw 111 and the claw 112 is reduced, the axle carrier 10 is pinched by the claws 111 and 112.

When the axle carrier 10 is pinched by the claws 111 and 112, neither the axle hub 11 nor the axle housing 12 can be rotated centering on the axis 1.

Accordingly, the axle carrier 10 is fixed at the measurement position by the carrier clamp 110 so as not to be rotatable.

The posture of the carrier clamp 110 is set so that the axis 1 of the axle carrier 10 is in parallel to a horizontal plane (a plane perpendicular to the direction of application of gravity) when the axle carrier 10 is fixed at the measurement position.

Accordingly, the carrier clamp 110 maintains the axle carrier 10 at "the posture at which the axis 1 of the axle carrier 10 is in parallel to the horizontal plane". Therefore, attachment angle θ between the axle carrier 10 and the absorber 20 can be measured while the posture of the axle carrier 10 and the absorber 20 is the same as (or similar to) the posture at the actual use, thereby improving reliability of a measurement result of the attachment angle θ between the axle carrier 10 and the absorber 20.

The absorber clamp 120 is an embodiment of an absorber fixation part according to the present invention and detachably fixes the absorber 20 at a position at which the absorber 20 can be attached to the axle carrier 10 fixed by the carrier clamp 110.

At the position at which the absorber 20 can be attached to the axle carrier 10 fixed by the carrier clamp 110 in this embodiment, the attachment bracket 12a of the axle carrier 10 fixed by the carrier clamp 110 overlaps the attachment bracket 21a of the absorber 20, and the two holes formed in the attachment bracket 12a are respectively in agreement with the holes formed in the attachment bracket 21a (that is, the bolts 31 and 32 are respectively inserted into these holes and the nuts (not shown) are screwed onto the bolts 31 and 32 so as to attach the absorber 20 to the axle carrier 10).

The absorber clamp 120 comprises a claw 121 and a claw 122.

The claw 121 and the claw 122 touch an outer peripheral surface of the absorber main body 21.

The distance (interval) between the claw 121 and the claw 122 is varied by operation of a hydraulic actuator (not shown) (for example, extension or contraction of a hydraulic cylinder).

The absorber main body 21 of the absorber 20 is arranged between the claw 121 and the claw 122 at the state that the distance between the claw 121 and the claw 122 is long (shown by a two-dot chain line in FIG. 1), and subsequently the distance between the claw 121 and the claw 122 is reduced so that the claw 121 and the claw 122 touch the outer peripheral surface of the absorber main body 21, whereby the absorber main body 21 of the absorber 20 is pinched by the claw 121 and the claw 122.

When the absorber main body 21 of the absorber 20 is pinched by the claw 121 and the claw 122, the absorber main body 21 of the absorber 20 cannot be rotated centering on the axis 2 and cannot be moved along the longer direction of the axis 2.

Accordingly, the absorber clamp 120 fixes the absorber 20 at the position at which the absorber 20 can be attached to the axle carrier 10 fixed by the carrier clamp 110.

The absorber clamp 120 fixes the absorber 20 at a posture at which the attachment angle θ between the axle carrier 10 fixed by the carrier clamp 110 and the absorber 20 is within a predetermined angular range.

The "predetermined angular range" in this embodiment is a range of the attachment angle θ between the axle carrier 10 and the absorber 20 permissible in the design or at use.

Accordingly, when the axle carrier 10 fixed by the carrier clamp 110 and the absorber 20 fixed by the absorber clamp 120 are fastened to each other by the bolts 31 and 32 so that the attachment angle θ between the axle carrier 10 and the absorber 20 is naturally within the predetermined angular range. Therefore, attachment work of the absorber 20 to the axle carrier 10 is made easy so as to improve workability (reduce number of processes of work, shorten working time or reduce load on an operator).

The light projecting and receiving unit 130 comprises a first shape measuring sensor 131, a second shape measuring sensor 132 and a sensor fixation member 133.

The first shape measuring sensor 131 comprises a casing 131a, a first illuminant 131b and a first CCD (Charge Coupled Device) image sensor 131c.

The casing 131a is a box-like member which serves as a main structure of the first shape measuring sensor 131 and houses the first illuminant 131b and the first CCD image sensor 131c. The casing 131a is fixed to the sensor fixation member 133.

The first illuminant 131b is an embodiment of a first light projecting part according to the present invention, and projects (irradiates) light of predetermined wavelength (for example, infrared light) to an outer peripheral surface of the absorber 20. For example, the first illuminant 131b comprises a semiconductor device generating light of predetermined wavelength.

In this embodiment, a slit light 41 is projected by the first illuminant 131b. The "slit light" is band-like light and is normally obtained by making light generated by an illuminant passing through a slit.

The first CCD image sensor 131c is an embodiment of a first light receiving part according to the present invention, and receives a reflected light 51 projected to the outer peripheral surface of the absorber 20 by the first illuminant 131b and reflected at the outer peripheral surface of the absorber 20.

In more detail, the first CCD image sensor 131c is a kind of so-called area image sensor (two-dimensional image sensor) constructed that a plurality of photodiodes is spread on a light receiving surface in predetermined arrangement (normally, in a lattice-like pattern) and electric charge generated by light received by each of the photodiodes is red by the CCD and transmitted so as to image a picture based on the intensity of the light reflected at the outer peripheral surface of the absorber 20 (the reflected light 51).

In this embodiment, the CCD image sensor (the first CCD image sensor 131c) is used as an embodiment of the first light receiving part according to the present invention. However, the present invention is not limited thereto and another area image sensor, such as a CMOS (Complementary Metal Oxide Semiconductor) image sensor, may be adopted.

The second shape measuring sensor 132 comprises a casing 132a, a second illuminant 132b and a second CCD image sensor 132c.

The casing 132a is a box-like member which serves as a main structure of the second shape measuring sensor 132 and houses the first illuminant 132b and the second CCD image sensor 132c. The casing 132a is fixed to at a position in the sensor fixation member 133 differ from the position at which the casing 121a of the first shape measuring sensor 131 is fixed.

The second illuminant 132b is an embodiment of a second light projecting part according to the present invention, and projects (irradiates) light of predetermined wavelength (for example, infrared light) to an outer peripheral surface of the absorber 20. For example, the second illuminant 132b comprises a semiconductor device generating light of predetermined wavelength.

In this embodiment, a slit light 42 is projected by the second illuminant 132b.

The second CCD image sensor 132c is an embodiment of a first light receiving part according to the present invention, and receives a reflected light 52 projected to the outer peripheral surface of the absorber 20 by the second illuminant 132b and reflected at the outer peripheral surface of the absorber 20.

In more detail, the second CCD image sensor 132c is a kind of so-called area image sensor (two-dimensional image sensor) constructed that a plurality of photodiodes is spread on a light receiving surface in predetermined arrangement (normally, in a lattice-like pattern) and electric charge generated by light received by each of the photodiodes is red by the CCD and transmitted so as to image a picture based on the intensity of the light reflected at the outer peripheral surface of the absorber 20 (the reflected light 52).

In this embodiment, the CCD image sensor (the second CCD image sensor 132c) is used as an embodiment of the second light receiving part according to the present invention. However, the present invention is not limited thereto and another area image sensor, such as a CMOS image sensor, may be adopted.

In this embodiment, each of the first shape measuring sensor 131 and the second shape measuring sensor 132 is for exclusive use. However, the present invention is not limited thereto and a commercial apparatus may be used instead of the sensor.

The sensor fixation member 133 fixes the first shape measuring sensor 131 and the second shape measuring sensor 132 at the predetermined positions.

The first shape measuring sensor 131 and the second shape measuring sensor 132 are fixed to the sensor fixation member 133 so as to fix positional relation between the first shape measuring sensor 131 and the second shape measuring sensor 132.

The sensor fixation member 133 is fixed to a structure (not shown) so that positional relation between the carrier clamp 110 and the first shape measuring sensor 131 (eventually, positional relation between the axle carrier 10 fixed to the "measurement position" by the carrier clamp 110 and the first shape measuring sensor 131) is fixed and positional relation between the carrier clamp 110 and the second shape measuring sensor 132 (eventually, positional relation between the axle carrier 10 fixed to the "measurement position" by the carrier clamp 110 and the second shape measuring sensor 132) is fixed.

In the state that the first shape measuring sensor 131 and the second shape measuring sensor 132 are fixed to the sensor fixation member 133 and the sensor fixation member 133 is fixed to the structure (not shown), each of the slit light 41 projected by the first illuminant 131b and the slit light 42 projected by the second illuminant 132b is in parallel to the horizontal plane.

As shown in FIG. 1, distance H1 between the axis 1 and the first illuminant 131b (the slit light 41) differs from distance H2 between the axis 1 and the second illuminant 132b (the slit light 42), and the distance H1 is longer than the distance H2 (H1>H2). The difference between the distance H1 and the distance H2 is indicated by ΔH (ΔH=H1−H2).

When the slit light 41 and the slit light 42 are projected to an outer peripheral surface of the absorber rod 22 of the absorber 20 fixed at the measurement position by the carrier clamp 110, the claw 121 and the claw 122 do not pinch the absorber 20 and the absorber 20 only touches the axle carrier 10 (the absorber 20 does not contact any member except the axle carrier 10).

Accordingly, when the slit light 41 and the slit light 42 are projected to the outer peripheral surface of the absorber rod 22, unnecessary external force is not applied on the absorber 20, thereby improving reliability of a measurement result of the attachment angle θ between the axle carrier 10 and the absorber 20.

The optical path distance calculating unit 140 is an embodiment of a first optical path distance calculating part according to the present invention, and calculates first optical path distance L1, which is the distance between the first illuminant 131b and a first reflection position 61a, based on the reflected light 51 received by the first CCD image sensor 131c.

The optical path distance calculating unit 140 is an embodiment of a second optical path distance calculating part according to the present invention, and calculates second optical path distance L2, which is the distance between the second illuminant 132b and a second reflection position 62a, based on the reflected light 52 received by the second CCD image sensor 132c.

The optical path distance calculating unit 140 is connected to the first shape measuring sensor 131 so as to turn on and off the first illuminant 131b (start and stop the projection) and to obtain information concerning the reflected light 51 received by the first CCD image sensor 131c, that is, an image based on the intensity of the reflected light 51.

Based on the image based on the intensity of the reflected light 51 obtained from the first CCD image sensor 131c, the optical path distance calculating unit 140 generates first profile 61 (see a thick solid line in FIG. 2) which is a shape of the part of the outer peripheral surface of the absorber rod 22 to which the slit light 41 is projected.

In more detail, based on the intensity of the reflected light 51 obtained from the first CCD image sensor 131c, the optical path distance calculating unit 140 calculates distance from the first illuminant 131b to each of points of the part to which the slit light 41 is projected according to the triangulation principle so as to generate the first profile 61.

With regard to the optical path distance calculating unit 140, a point which is the closest to the first illuminant 131b on the first profile 61 is regarded as the first reflection position 61a, and the distance between the first illuminant 131b and the first reflection position 61a is regarded as the first optical path distance L1.

The optical path distance calculating unit 140 is connected to the second shape measuring sensor 132 so as to turn on and off the second illuminant 132b (start and stop the projection) and to obtain information concerning the reflected light 52 received by the second CCD image sensor 132c, that is, an image based on the intensity of the reflected light 52.

Based on the image based on the intensity of the reflected light 52 obtained from the second CCD image sensor 132c, the optical path distance calculating unit 140 generates second profile 62 (see a thick solid line in FIG. 2) which is a shape of the part of the outer peripheral surface of the absorber rod 22 to which the slit light 42 is projected.

In more detail, based on the intensity of the reflected light 52 obtained from the second CCD image sensor 132c, the optical path distance calculating unit 140 calculates distance from the second illuminant 132b to each of points of the part to which the slit light 42 is projected according to the triangulation principle so as to generate the second profile 62.

With regard to the optical path distance calculating unit 140, a point which is the closest to the second illuminant 132b on the second profile 62 is regarded as the second reflection position 62a, and the distance between the second illuminant 132b and the second reflection position 62a is regarded as the second optical path distance L2.

In this embodiment, the optical path distance calculating unit 140 serves as both the first optical path distance calculating part according to the present invention and the second optical path distance calculating part according to the present invention (the first optical path distance calculating part and the second optical path distance calculating part are constructed integrally). However, the present invention is not limited thereto and the first optical path distance calculating part may be separated from the second optical path distance calculating part.

The analyzing unit 150 comprises an analyzing device 151, an input device 152 and a display device 153.

The analyzing device 151 stores various programs, such as a later-discussed attachment angle calculation program, expands the programs, performs predetermined calculation according to the programs, and memorizes results of the calculation.

In substance, the analyzing device 151 may be constructed by connecting a CPU, a ROM, a RAM, a HDD and the like to each other through a bus, or alternatively may be constructed by a one-chip LSI or the like.

In this embodiment, the analyzing device 151 is for exclusive use. However, a commercial personal computer or workstation storing the programs may alternatively be adopted as the analyzing device 151.

The analyzing device 151 is connected to the optical path distance calculating unit 140 so as to obtain the information concerning the first optical path distance L1 and the second optical path distance L2 calculated by the optical path distance calculating unit 140.

The input device 152 is connected to the analyzing device 151 so as to input to the analyzing device 151 various information and commands concerning measurement of the attachment angle θ between the axle carrier 10 and the absorber 20.

In this embodiment, the input device 152 is for exclusive use. However, the same effect can be obtained by adopting a commercial keyboard, mouse, pointing device, button, switch or the like.

The display device 153 displays contents of input from the input device 152 to the analyzing device 151, status of operation of the attachment angle measuring device 100, the measurement result of the attachment angle θ between the axle carrier 10 and the absorber 20 and the like.

In this embodiment, the display device 153 is for exclusive use. However, the same effect can be obtained by adopting a commercial liquid crystal display (LCD), cathode ray tube display (CRT display) or the like.

Explanation will be given on the construction of the analyzing device 151 in detail.

Functionally, the analyzing device 151 comprises a memory part 151a and an attachment angle calculation part 151b.

The memory part 151a memorizes various parameters (numerical values) used in calculation by the attachment angle calculation part 151b (calculation of the measurement result of the attachment angle θ between the axle carrier 10 and the absorber 20), history of the status of operation of the attachment angle measuring device 100, the measurement result and the like.

In substance, the memory part 151a comprises a memory such as a RAM and a storage media such as a HDD, a CD-ROM or a DVD-ROM.

The attachment angle calculation part 151b is an embodiment of an attachment angle calculation part according to the present invention, and calculates the attachment angle θ between the axle carrier 10 and the absorber 20 based on the first optical path distance L1 and the second optical path distance L2 calculated by the optical path distance calculating unit 140.

In substance, the analyzing device 151 performs predetermined calculation and the like according to an angle calculation program stored in the analyzing device 151 so as to serve as the attachment angle calculation part 151b.

By substituting "the difference ΔH between the distance H1 between the axis 1 and the first illuminant 131b and the distance H2 between the axis 1 and the second illuminant 132b (=H1−H2)", which is previously memorized by the memory part 151a, and "the first optical path distance L1 and the second optical path distance L2", which is calculated by the optical path distance calculating unit 140, for a below Numerical Formula 1, the attachment angle calculation part 151b calculates the attachment angle θ between the axle carrier 10 and the absorber 20.

The calculated attachment angle θ is suitably memorized by the memory part 151a.

$$\theta = \tan^{-1}\left(\frac{\Delta H}{L2 - L1}\right) \qquad \text{[Numerical Formula 1]}$$

Accordingly, the attachment angle measuring device 100 measuring the attachment angle θ between the axle carrier 10 rotatably supporting the wheel (not shown) and the absorber 20 comprising the absorber main body 21 attached to the axle carrier 10 and the absorber rod 22 slidably inserted into the absorber main body 21, comprises:

the first illuminant 131b projecting light (the slit light 41) to the first reflection position 61a on the outer peripheral surface of the absorber rod 22 when the axle carrier 10 is fixed at the predetermined measurement position, the absorber 20 (in more detail, the absorber main body 21) is attached to the axle carrier 10 and the absorber rod 22 does not contact any member except the axle carrier 10;

the first CCD image sensor 131c receiving the reflected light 51 from the first reflection position 61a;

the second illuminant 132b projecting light (the slit light 42) to the second reflection position 62a difference from the first reflection position 61a on the outer peripheral surface of the absorber rod 22 when the axle carrier 10 is fixed at the predetermined measurement position, the absorber 20 (in more detail, the absorber main body 21) is attached to the axle carrier 10 and the absorber rod 22 does not contact any member except the axle carrier 10;

the second CCD image sensor 132c receiving the reflected light 52 from the second reflection position 62a;

the optical path distance calculating unit 140 calculating the first optical path distance L1 between the first illuminant 131b and the first reflection position 61a based on the reflected light 51 received by the first CCD image sensor 131c and the second optical path distance L2 between the second illuminant 132b and the second reflection position 62a based on the reflected light 52 received by the second CCD image sensor 132c; and the attachment angle calculation part 151b calculating the attachment angle θ between the axle carrier 10 and the absorber 20 based on the first optical path distance L1 and the second optical path distance L2 calculated by the optical path distance calculating unit 140.

Accordingly, the attachment angle measuring device 100 can measure the attachment angle θ between the axle carrier 10 and the absorber 20 accurately.

That is because (1) the attachment angle θ between the axle carrier 10 and the absorber 20 is measured without contacting the absorber 20 by using the slit light 41 and the slit light 42 and (2) the slit light 41 and the slit light 42 are projected to the outer peripheral surface of the absorber rod 22 which is dimensionally accurate because of being slid about the absorber main body 21.

The measurement of the attachment angle θ between the axle carrier 10 and the absorber 20 by the attachment angle measuring device 100 is performed in a moment except the fixation of the axle carrier 10 to the predetermined "measurement position" so as to reduce time required for the measurement of the attachment angle θ, whereby total inspection of the attachment angle θ between the axle carrier 10 and the absorber 20 in the process of attachment of the absorber 20 to the axle carrier 10 is enabled.

In the light of improvement of accuracy of the measurement of the attachment angle θ between the axle carrier 10 and the absorber 20, it is preferable that the absorber rod 22 is projected from the absorber main body 21 to the utmost and ΔH is made large to the utmost at the time of the measurement of the attachment angle θ.

The first illuminant 131b and the second illuminant 132b of the attachment angle measuring device 100 project the slit light 41 and the slit light 42 to the absorber rod 22, and the optical path distance calculating unit 140 generates the first profile 61 of the outer peripheral surface of the absorber rod 22 based on the reflected light 51 received by the first CCD image sensor 131c and regards the point which is the closest to the first illuminant 131b on the first profile 61 as the first reflection position 61a so as to calculates the first optical path distance L1, and generates the second profile 62 of the outer peripheral surface of the absorber rod 22 based on the reflected light 52 received by the second CCD image sensor 132c and regards the point which is the closest to the second illuminant 132b on the second profile 62 as the second reflection position 62a so as to calculates the second optical path distance L2.

Accordingly, when each of the slit light 41 and the slit light 42 is within the range in which the light is projected to the outer peripheral surface of the absorber rod 22, the attachment angle measuring device 100 can measure the attachment angle θ between the axle carrier 10 and the absorber 20 accurately even if the positional relation between each of the first illuminant 131b and the second illuminant 132b and the absorber rod 22 is slightly changed.

The attachment angle measuring device 100 can measure the attachment angle θ between the axle carrier 10 and the absorber 20 accurately without making the absorber rod 22 face the first illuminant 131b and the second illuminant 132b accurately (when each of the slit light 41 and the slit light 42 is within the range in which the light is projected to the outer peripheral surface of the absorber rod 22). Accordingly, load for the fixation of the axle carrier 10 to which the absorber 20 is attached to the predetermined "measurement position" (labor for making the absorber rod 22 face the first illuminant 131b and the second illuminant 132b accurately) is reduced, thereby reducing the time for the measurement of the attachment angle θ.

The attachment angle calculation part 151b of the attachment angle measuring device 100 calculates the attachment angle θ between the axle carrier 10 and the absorber 20 by substituting the difference ΔH between the distance H1 between the axis 1 of the axle carrier 10 fixed at the measurement position by the carrier clamp 110 and the first illuminant 131b and the distance H2 between the axis 1 and the second illuminant 132b (=H1−H2) and the first optical path distance L1 and the second optical path distance L2 for the Numerical Formula 1.

Accordingly, the attachment angle measuring device 100 can calculate the attachment angle θ between the axle carrier 10 and the absorber 20 according to the predetermined numerical formula which can be calculated easily (in this embodiment, the Numerical Formula 1), thereby calculating the attachment angle θ accurately.

The attachment angle measuring device 100 comprises the carrier clamp 110 detachably fixing the axle carrier 10 to the measurement position.

Accordingly, the attachment angle measuring device 100 can maintain the posture of the axle carrier 10 at the time of the measurement of the attachment angle θ, thereby improving reliability of the measurement result of the attachment angle θ.

The attachment angle measuring device 100 comprises the absorber clamp 120 fixing the absorber 20 at the position at which the absorber 20 can be attached to the axle carrier 10 fixed by the carrier clamp 110.

Accordingly, after attaching the absorber 20 to the axle carrier 10, the attachment angle measuring device 100 can measures the attachment angle θ while maintaining the fixation of the axle carrier 10 by the carrier clamp 110. The process of attaching the absorber 20 to the axle carrier 10 and the process of measuring the attachment angle θ can be performed consistently, whereby the efficiency of these processes are improved (the cycle time is reduced and the labor is reduced).

In the process of attaching the absorber 20 to the axle carrier 10, total inspection of the attachment angle θ is enabled.

The absorber clamp 120 of the attachment angle measuring device 100 fixes the absorber 20 at the posture at which the attachment angle θ between the axle carrier 10 fixed by the carrier clamp 110 and the absorber 20 is within a predetermined angular range.

Accordingly, with regard to the attachment angle measuring device 100, by attaching the absorber 20 to the axle carrier 10 fixed by the carrier clamp 110, the attachment angle θ between the axle carrier 10 and the absorber 20 is naturally within the predetermined angular range. Therefore, the attachment work of the absorber 20 to the axle carrier 10 is made easy so as to improve workability (reduce number of processes of work, shorten working time or reduce load on an operator).

In this embodiment, the optical path distance calculating unit 140 generates the first profile 61 of the outer peripheral surface of the absorber rod 22 based on the reflected light 51 received by the first CCD image sensor 131c and regards the point which is the closest to the first illuminant 131b on the first profile 61 as the first reflection position 61a so as to calculate the first optical path distance L1, and generates the second profile 62 of the outer peripheral surface of the absorber rod 22 based on the reflected light 52 received by the second CCD image sensor 132c and regards the point which is the closest to the second illuminant 132b on the second profile 62 as the second reflection position 62a so as to calculate the second optical path distance L2. However, the present invention is not limited thereto.

Figure 3:
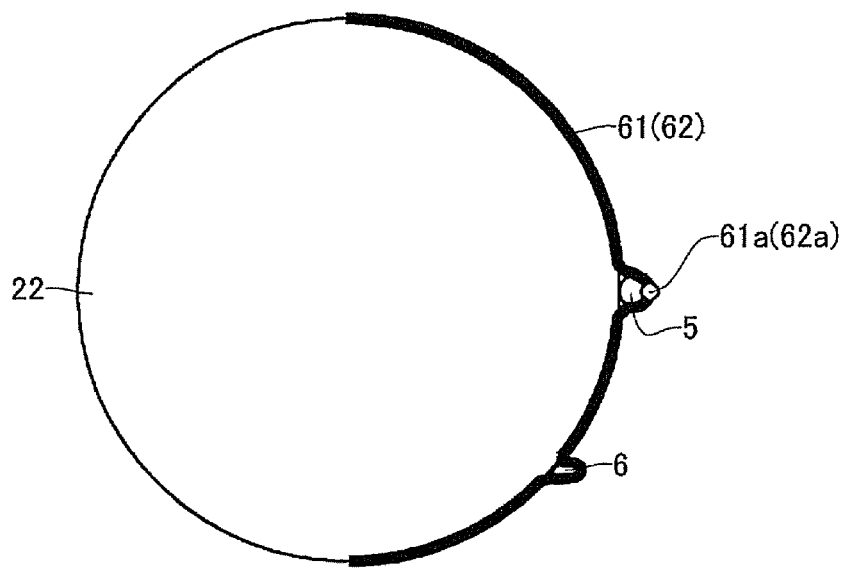
FIG. 3 It is a drawing of relation between a first profile and a first correction profile and between a second profile and a second correction profile.
Figure 3:
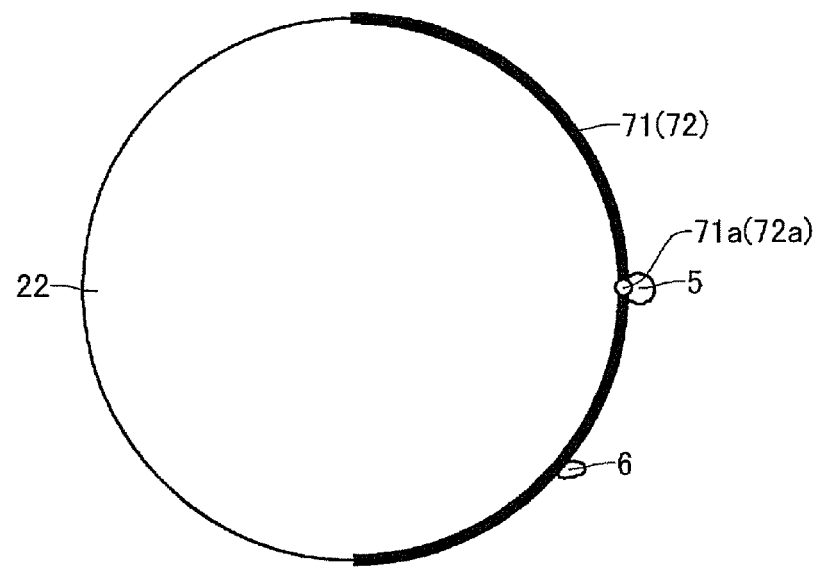

As shown in FIG. 3, according to the sectional form of the absorber rod 22 which is circular, the calculation may alternatively be constructed as in the following. The optical path distance calculating unit 140 generates a first correction profile 71 by correcting the first profile 61 as a circular arc (or an elliptical arc), and a point which is the closest to the first illuminant 131b on the first correction profile 71 is regarded as a first reflection position 71a so as to calculate the first optical path distance L1. Also, the optical path distance calculating unit 140 generates a second correction profile 72 by correcting the second profile 62 as a circular arc (or an elliptical arc), and a point which is the closest to the second illuminant 132b on the second correction profile 72 is regarded as a second reflection position 72a so as to calculate the second optical path distance L2.

Accordingly, even if foreign matters 5 and 6 are stuck on the outer peripheral surface of the absorber rod 22, the attachment angle measuring device 100 can calculate the first optical path distance L1 and the second optical path distance L2 accurately, thereby improving reliability of the measurement result of the attachment angle θ.

In this embodiment, the first illuminant 131b and the second illuminant 132b are separated from each other and the first CCD image sensor 131c and the second CCD image sensor 132c are separated from each other. However, the present invention is not limited thereto.

It may alternatively be constructed that the first shape measuring sensor 131 is movable along the vertical direction (the direction in parallel to the horizontal plane) and the distance between the axis 1 and the first illuminant 131b (the slit light 41) so as to project the slit light 41 to the outer peripheral surface of the absorber rod 22. Accordingly, the first shape measuring sensor 131 serves as the first light projecting part, the second light projecting part, the first light receiving part and the second light receiving part according to the present invention so that the second shape measuring sensor 132 may be omitted.

The first light projecting part and the second light projecting part according to the present invention need not to be constructed integrally. When the distance between the first light projecting part and the axis of the axle carrier (rotation center) is variable, the first light projecting part can serve as the second light projecting part.

Also, the first light receiving part and the second light receiving part according to the present invention need not to be constructed integrally. When the distance between the first light receiving part and the axis of the axle carrier (rotation center) is variable, the first light receiving part can serve as the second light receiving part.

In this embodiment, the absorber 20 fixed by the absorber clamp 120 is attached to the axle carrier 10 fixed by the carrier clamp 110, the absorber clamp 120 is unclamped (the fixation of the absorber clamp 120 is released), and then the slit lights 41 and 42 are projected to the outer peripheral surface of the absorber rod 22 of the absorber 20 so as to measure the attachment angle θ. However, it may alternatively be constructed that the slit lights 41 and 42 are projected to the outer peripheral surface of the absorber rod 22 of the absorber 20 while the absorber clamp 120 fixing the absorber 20 is moved or rocked in the vicinity of the position at which the absorber 20 can be attached to the axle carrier 10 fixed by the carrier clamp 110 so as to measure the attachment angle θ, and when the attachment angle θ becomes within the predetermined range of set angle, the absorber 20 is attached to the axle carrier 10. This construction is effective in the case that the angle of the absorber 20 fixed by the absorber clamp 120 is not accurate.

In this embodiment, the attachment angle calculation part 151b calculates the attachment angle θ between the axle carrier 10 and the absorber 20. However, under the condition that the projection direction of the slit light 41 and the slit light 42 is in agreement with the longer direction of the axis 1, by substituting the difference ΔH between the distance H1 between the axis 1 of the axle carrier 10 fixed at the measurement position by the carrier clamp 110 and the first illuminant 131b and the distance H2 between the axis 1 of the axle carrier 10 fixed at the measurement position by the carrier clamp 110 and the second illuminant 132b (=H1−H2), the first optical path distance L1 and the second optical path distance L2 for a below Numerical Formula 2, a camber angle φ between the axle carrier 10 and the absorber 20 is calculated.

$$\phi = \tan^{-1}\left(\frac{L2 - L1}{\Delta H}\right) \qquad \text{[Numerical Formula 2]}$$

Explanation will be given on an embodiment of attachment angle measuring method according to the present invention referring FIGS. 1 to 4.

Figure 4:
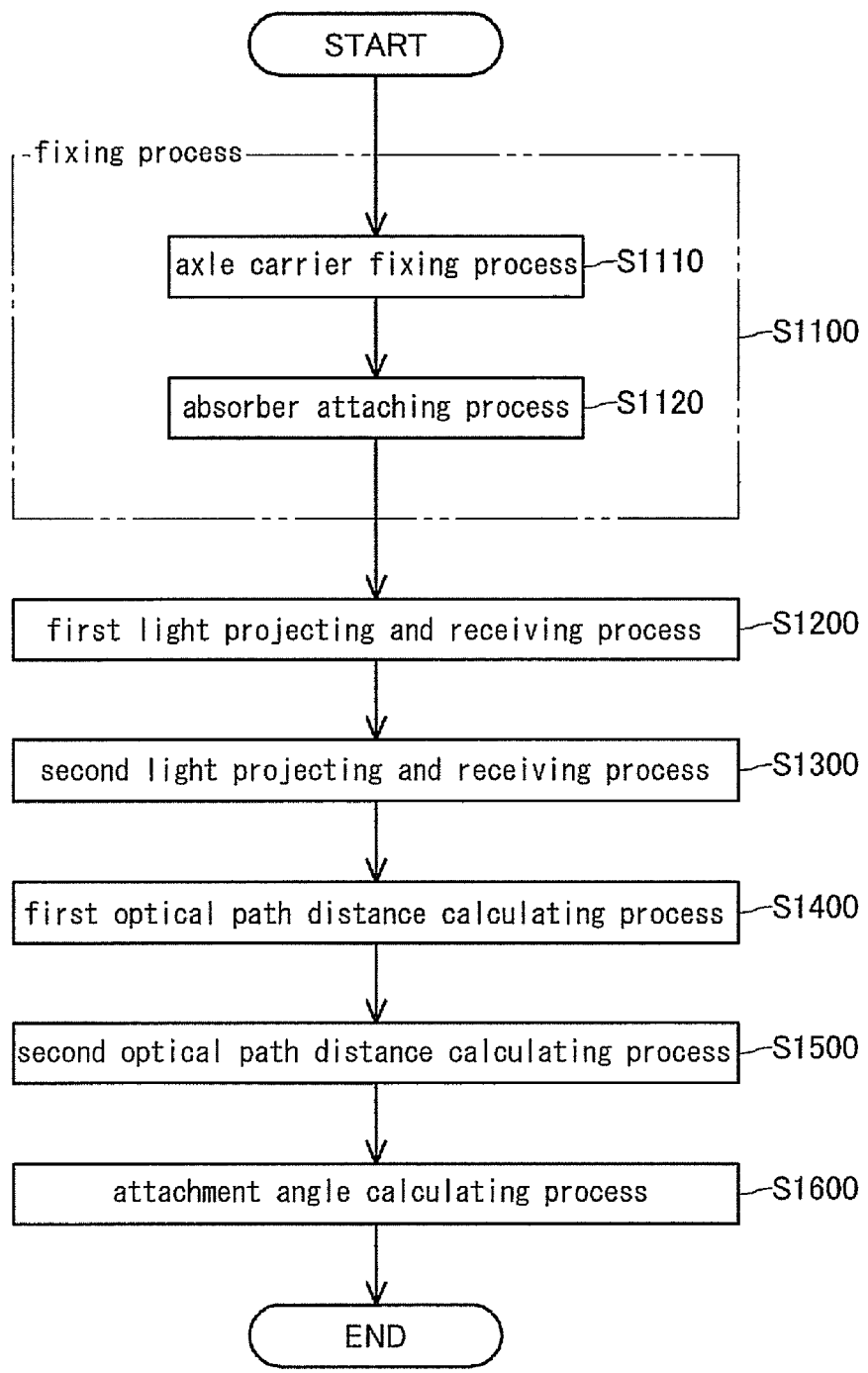
FIG. 4 It is a flow chart of an attachment angle measuring method according to the present invention.
Figure 5:
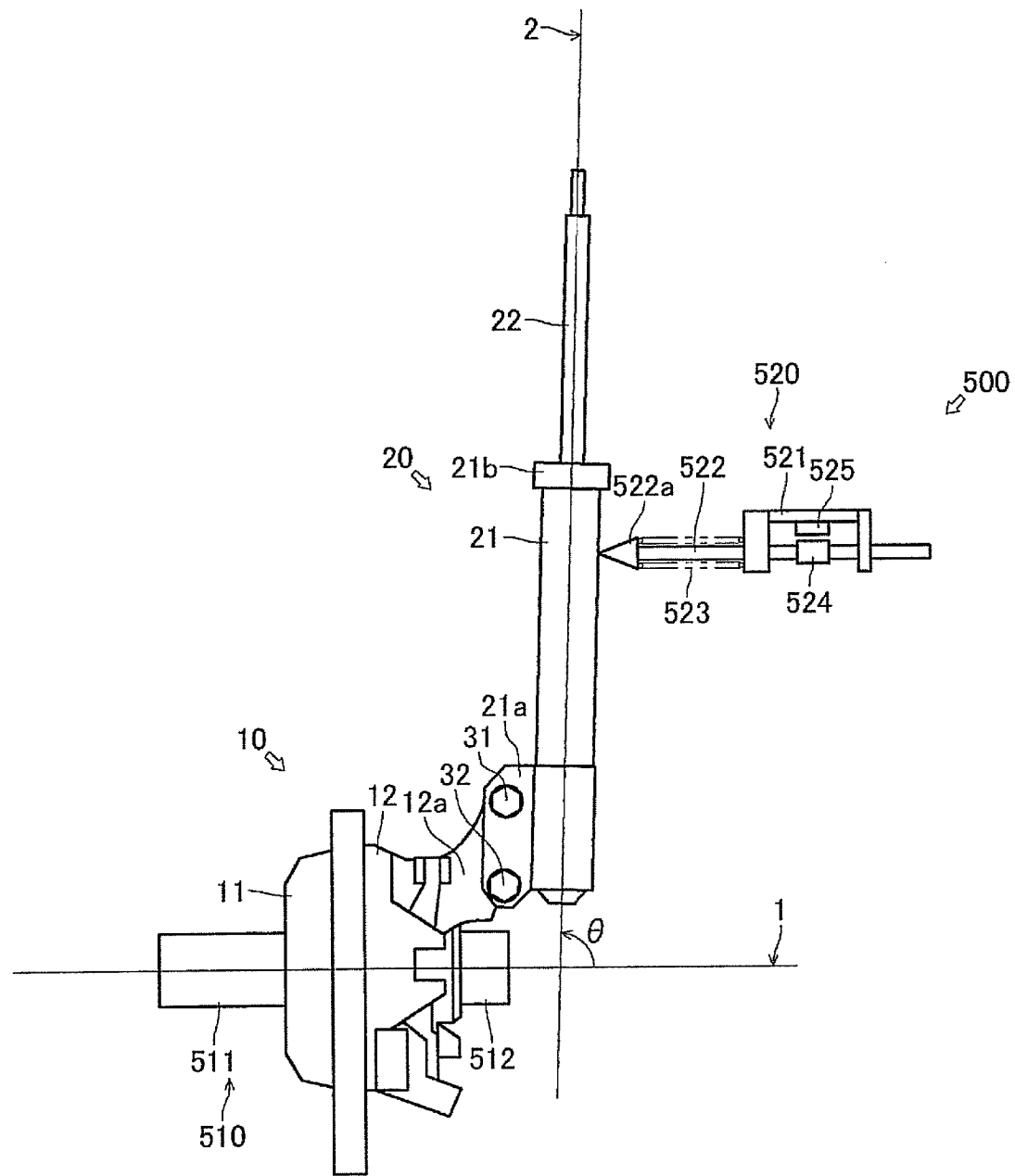
FIG. 5 It is a drawing of a conventional attachment angle measuring device.

With regard to the embodiment of attachment angle measuring method according to the present invention, the attachment angle θ between the axle carrier 10 and the absorber 20 (in this embodiment, the angle between the axis 1 and the axis 2 in FIG. 1) is measured with the attachment angle measuring device 100 shown in FIG. 1, and the embodiment comprises a fixing process S1100, a first light projecting and receiving process S1200, a second light projecting and receiving process S1300, a first optical path distance calculating process S1400, a second optical path distance calculating process S1500 and an attachment angle calculating process S1600 as shown in FIG. 4.

In the fixing process S1100, the axle carrier 10 to which the absorber 20 is attached is fixed at the measurement position. The fixing process S1100 comprises an axle carrier fixing process S1110 and an absorber attaching process S1120.

In the axle carrier fixing process S1110, the axle carrier 10 is fixed at the measurement position.

In this embodiment, the carrier clamp 110 fixes the axle carrier 10 at the measurement position at the axle carrier fixing process S1110.

When the axle carrier fixing process S1110 is finished, the measurement shifts to the absorber attaching process S1120.

In the absorber attaching process S1120, the absorber 20 is attached to the axle carrier 10 fixed at the measurement position in the axle carrier fixing process S1110.

In this embodiment, the absorber 20 fixed by the absorber clamp 120 at the position at which the absorber 20 can be attached to the axle carrier 10 is fastened to the axle carrier 10 with the bolts 31 and 32 and the nuts (not shown) so that the absorber 20 is fixed to the axle carrier 10.

When the absorber attaching process S1120 is finished, the fixing process S1100 is finished and the measurement shifts to the first light projecting and receiving process S1200.

In the first light projecting and receiving process S1200, the absorber 20 attached to the axle carrier 10 fixed at the measurement position is kept not contacting anything except the axle carrier 10, and the slit light 41 is projected to the first reflection position 61a on the outer peripheral surface of the absorber rod 22 of the absorber 20 and the reflected light 51 from the first reflection position 61a is received.

In this embodiment, in the first light projecting and receiving process S1200, the first illuminant 131b of the first shape measuring sensor 131 projects the slit light 41 to the first reflection position 61a on the outer peripheral surface of the absorber rod 22 of the absorber 20, and the first CCD image sensor 131c of the first shape measuring sensor 131 receives the reflected light 51 from the first reflection position 61a.

When the first light projecting and receiving process S1200 is finished, the measurement shifts to the second light projecting and receiving process S1300.

In the second light projecting and receiving process S1300, the absorber 20 attached to the axle carrier 10 fixed at the measurement position is kept not contacting anything except the axle carrier 10, and the slit light 42 is projected to the second reflection position 62a on the outer peripheral surface of the absorber rod 22 of the absorber 20 difference from the first reflection position 61a and the reflected light 52 from the second reflection position 62a is received.

In this embodiment, in the second light projecting and receiving process S1300, the second illuminant 132b of the second shape measuring sensor 132 projects the slit light 42 to the second reflection position 62a on the outer peripheral surface of the absorber rod 22 of the absorber 20, and the second CCD image sensor 132c of the second shape measuring sensor 132 receives the reflected light 52 from the second reflection position 62a.

When the second light projecting and receiving process S1300 is finished, the measurement shifts to the first optical path distance calculating process S1400.

In the first optical path distance calculating process S1400, the first optical path distance L1 between the projection start position in the first light projecting and receiving process S1200 and the first reflection position 61a based on the reflected light 51 received in the first light projecting and receiving process S1200.

In this embodiment, in the first optical path distance calculating process S1400, the optical path distance calculating unit 140 calculates the first optical path distance L1 between the projection start position in the first light projecting and receiving process S1200 (that is, the first illuminant 131b) and the first reflection position 61a based on the reflected light 51 received by the first CCD image sensor 131c.

When the first optical path distance calculating process S1400 is finished, the measurement shifts to the second optical path distance calculating process S1500

In the second optical path distance calculating process S1500, the second optical path distance L2 between the projection start position in the second light projecting and receiving process S1300 and the second reflection position 62a based on the reflected light 52 received in the second light projecting and receiving process S1300.

In this embodiment, in the second optical path distance calculating process S1500, the optical path distance calculating unit 140 calculates the second optical path distance L2 between the projection start position in the second light projecting and receiving process S1300 (that is, the second illuminant 132b) and the second reflection position 62a based on the reflected light 52 received by the second CCD image sensor 132c.

When the second optical path distance calculating process S1500 is finished, the measurement shifts to the attachment angle calculating process S1600.

In the attachment angle calculating process S1600, the attachment angle θ between the axle carrier 10 and the absorber 20 is calculated based on the first optical path distance L1 and the second optical path distance L2.

In this embodiment, in the attachment angle calculating process S1600, the attachment angle calculation part 151b calculates the attachment angle θ between the axle carrier 10 and the absorber 20 by substituting "the difference ΔH between the distance H1 between the axis 1 and the first illuminant 131b and the distance H2 between the axis 1 and the second illuminant 132b (=H1−H2)" and "the first optical path distance L1" and "the second optical path distance L2" for the Numerical Formula 1.

The embodiment of attachment angle measuring method according to the present invention measuring the attachment angle θ between the axle carrier 10 rotatably supporting the wheel and the absorber 20 comprising the absorber main body 21 attached to the axle carrier 10 and the absorber rod 22 slidably inserted into the absorber main body 21, comprises:

the fixing process S1100 in which the axle carrier 10 to which the absorber 20 is attached is fixed at the measurement position set previously;

the first light projecting and receiving process S1200 in which the absorber 20 attached to the axle carrier 10 fixed at the measurement position is kept not contacting anything except the axle carrier 10, and the slit light 41 is projected to the first reflection position 61a on the outer peripheral surface of the absorber rod 22 of the absorber 20 and the reflected light 51 from the first reflection position 61a is received;

the second light projecting and receiving process S1300 in which the absorber 20 attached to the axle carrier 10 fixed at the measurement position is kept not contacting anything except the axle carrier 10, and the slit light 42 is projected to the second reflection position 62a on the outer peripheral surface of the absorber rod 22 of the absorber 20 difference from the first reflection position 61a and the reflected light 52 from the second reflection position 62a is received;

the first optical path distance calculating process S1400 in which the first optical path distance L1 between the projection start position in the first light projecting and receiving process S1200 and the first reflection position 61a based on the reflected light 51 received in the first light projecting and receiving process S1200;

the second optical path distance calculating process S1500 in which the second optical path distance L2 between the projection start position in the second light projecting and receiving process S1300 and the second reflection position 62a based on the reflected light 52 received in the second light projecting and receiving process S1300; and the attachment angle calculating process S1600 in which the attachment angle between the axle carrier 10 and the absorber 20 is calculated based on the first optical path distance L1 and the second optical path distance L2.

Accordingly, with the embodiment of attachment angle measuring method according to the present invention, the attachment angle θ between the axle carrier 10 and the absorber 20 can be measured accurately.

That is because (1) the attachment angle θ between the axle carrier 10 and the absorber 20 is measured without contacting the absorber 20 by using the slit light 41 and the slit light 42 and (2) the slit light 41 and the slit light 42 are projected to the outer peripheral surface of the absorber rod 22 which is dimensionally accurate because of being slid about the absorber main body 21.

The measurement of the attachment angle θ between the axle carrier 10 and the absorber 20 with the embodiment of attachment angle measuring method according to the present invention is performed in a moment except the fixation of the axle carrier 10 to the predetermined "measurement position" so as to reduce time required for the measurement of the attachment angle θ, whereby total inspection of the attachment angle θ between the axle carrier 10 and the absorber 20 in the process of attachment of the absorber 20 to the axle carrier 10 is enabled.

With regard to the embodiment of attachment angle measuring method according to the present invention, in the first light projecting and receiving process S1200 and the second light projecting and receiving process S1300, the slit light 41 and the slit light 42 are projected to the absorber rod 22 respectively, in the first optical path distance calculating process S1400, the first profile 61 of the outer peripheral surface of the absorber rod 22 is generated based on the reflected light 51 received in the first light projecting and receiving process S1200 and regards the point which is the closest to the projection start position in the first light projecting and receiving process S1200 (that is, the first illuminant 131b) on the first profile 61 as the first reflection position 61a so as to calculates the first optical path distance L1, and in the second optical path distance calculating process S1500, the second profile 62 of the outer peripheral surface of the absorber rod 22 is generated based on the reflected light 52 received in the second light projecting and receiving process S1300 and regards the point which is the closest to the projection start position in the second light projecting and receiving process S1300 (that is, the second illuminant 132b) on the second profile 62 as the second reflection position 62a so as to calculates the second optical path distance L2.

Accordingly, when each of the slit light 41 and the slit light 42 is within the range in which the light is projected to the outer peripheral surface of the absorber rod 22, the attachment angle θ between the axle carrier 10 and the absorber 20 can be measured accurately with the embodiment of attachment angle measuring method according to the present invention even if the positional relation between each of the projection start position in the first light projecting and receiving process S1200 (that is, the first illuminant 131b) and the projection start position in the second light projecting and receiving process S1300 (that is, the second illuminant 132b) and the absorber rod 22 is slightly changed.

With the embodiment of attachment angle measuring method according to the present invention, the attachment angle θ between the axle carrier 10 and the absorber 20 can be measured accurately without making the absorber rod 22 face the projection start position in the first light projecting and receiving process S1200 (that is, the first illuminant 131b) and the projection start position in the second light projecting and receiving process S1300 (that is, the second illuminant 132b) accurately (when each of the slit light 41 and the slit light 42 is within the range in which the light is projected to the outer peripheral surface of the absorber rod 22). Accordingly, load for the fixation of the axle carrier 10 to which the absorber 20 is attached to the predetermined "measurement position" (labor for making the absorber rod 22 face the projection start position in the first light projecting and receiving process S1200 (that is, the first illuminant 131b) and the projection start position in the second light projecting and receiving process S1300 (that is, the second illuminant 132b) accurately) is reduced, thereby reducing the time for the measurement of the attachment angle θ.

With regard to the embodiment of attachment angle measuring method according to the present invention, in the first optical path distance calculating process S1400, the first correction profile 71 is generated by correcting the first profile 61 as a circular arc or an elliptical arc, and a point which is the closest to the projection start position in the first light projecting and receiving process S1200 (that is, the first illuminant 131b) on the first correction profile 71 is regarded as a first reflection position 71a so as to calculate the first optical path distance L1, and in the second optical path distance calculating process S1500, the second correction profile 72 is generated by correcting the second profile 62 as a circular arc or an elliptical arc, and a point which is the closest to the projection start position in the second light projecting and receiving process S1300 (that is, the second illuminant 132b) on the second correction profile 72 is regarded as a second reflection position 72a so as to calculate the second optical path distance L2.

Accordingly, the first optical path distance L1 and the second optical path distance L2 can be calculated accurately with the embodiment of attachment angle measuring method according to the present invention even if foreign matters 5 and 6 are stuck on the outer peripheral surface of the absorber rod 22, thereby improving reliability of the measurement result of the attachment angle θ.

With regard to the embodiment of attachment angle measuring method according to the present invention, in the attachment angle calculating process S1600, the attachment angle θ between the axle carrier 10 and the absorber 20 is calculated by substituting the difference ΔH between the distance H1 between the axis 1 and the projection start position in the first light projecting and receiving process S1200 (that is, the first illuminant 131b) and the distance H2 between the axis 1 and the projection start position in the second light projecting and receiving process S1300 (that is, the second illuminant 132b)(=H1−H2) and the first optical path distance L1 and the second optical path distance L2 for the Numerical Formula 1.

Accordingly, with the embodiment of attachment angle measuring method according to the present invention, the attachment angle θ between the axle carrier 10 and the absorber 20 can be calculated according to the predetermined numerical formula which can be calculated easily, thereby calculating the attachment angle θ accurately.

The fixing process S1100 of the embodiment of attachment angle measuring method according to the present invention comprises:

the axle carrier fixing process S1110 in which the axle carrier 10 is fixed at the measurement position; and the absorber attaching process S1120 in which the absorber 20 is attached to the axle carrier 10 fixed at the measurement position in the axle carrier fixing process S1110.

Accordingly, with the embodiment of attachment angle measuring method according to the present invention, the posture of the axle carrier 10 can be maintained at the time of the measurement of the attachment angle θ, thereby improving reliability of the measurement result of the attachment angle θ.

With the embodiment of attachment angle measuring method according to the present invention, after attaching the absorber 20 to the axle carrier 10, the attachment angle θ can be measured while maintaining the fixation of the axle carrier 10 by the carrier clamp 110. The process of attaching the absorber 20 to the axle carrier 10 and the process of measuring the attachment angle θ can be performed consistently, whereby the efficiency of these processes are improved (the cycle time is reduced and the labor is reduced).

Furthermore, in the process of attaching the absorber 20 to the axle carrier 10, total inspection of the attachment angle θ is enabled.

In this embodiment, the measurement shifts to the second light projecting and receiving process S1300 after the first light projecting and receiving process S1200 is finished. However, the present invention is not limited thereto. The measurement may shift to the first light projecting and receiving process after the second light projecting and receiving process is finished, or alternatively the first light projecting and receiving process and the second light projecting and receiving process may be performed simultaneously.

In this embodiment, the measurement shifts to the second optical path distance calculating process S1500 after the first optical path distance calculating process S1400 is finished. However, the present invention is not limited thereto. The measurement may shift to the first optical path distance calculating process after the second optical path distance calculating process is finished, or alternatively the first optical path distance calculating process and the second optical path distance calculating process may be performed simultaneously.

INDUSTRIAL APPLICABILITY

The present invention is suitable to an art of measurement of an attachment angle between an axle carrier and an absorber of a vehicle such as a car.

The invention claimed is:

1. An attachment angle measuring device measuring an attachment angle between an axle carrier rotatably supporting a wheel and an absorber comprising an absorber main body attached to the axle carrier and an absorber rod slidably inserted into the absorber main body, comprising:
   a first light projecting part projecting a light to a first reflection position on an outer peripheral surface of the absorber rod when the axle carrier is fixed at a predetermined measurement position, the absorber is attached to the axle carrier and the absorber rod does not contact any member except the axle carrier;
   a first light receiving part receiving the reflected light from the first reflection position;
   a second light projecting part projecting a light to a second reflection position different from the first reflection position on the outer peripheral surface of the absorber rod when the axle carrier is fixed at the predetermined measurement position, the absorber is attached to the axle carrier and the absorber rod does not contact any member except the axle carrier;
   a second light receiving part receiving the reflected light from the second reflection position;
   a first optical path distance calculating part calculating a first optical path distance between the first light projecting part and the first reflection position based on the reflected light received by the first light receiving part;
   a second optical path distance calculating part calculating a second optical path distance between the second light projecting part and the second reflection position based on the reflected light received by the second light receiving part; and
   an attachment angle calculation part calculating the attachment angle between the axle carrier and the absorber based on the first optical path distance and the second optical path distance.

2. The attachment angle measuring device as set forth in claim 1, wherein
   the first light projecting part and the second light projecting part project a slit light to the absorber rod,
   the first optical path distance calculating part generates a first profile of the outer peripheral surface of the absorber rod based on the reflected light received by the first light receiving part and regards a point which is the closest to the first light projecting part on the first profile as the first reflection position so as to calculate the first optical path distance, and
   the second optical path distance calculating part generates a second profile of the outer peripheral surface of the absorber rod based on the reflected light received by the second light receiving part and regards a point which is the closest to the second light projecting part on the second profile as the second reflection position so as to calculate the second optical path distance.

3. The attachment angle measuring device as set forth in claim 2, wherein
   the first optical path distance calculating part generates a first correction profile by correcting the first profile as a circular arc or an elliptical arc, and a point which is the closest to the first light projecting part on the first correction profile is regarded as the first reflection position so as to calculate the first optical path distance, and
   the second optical path distance calculating part generates a second correction profile by correcting the second profile as a circular arc or an elliptical arc, and a point which is the closest to the second light projecting part on the second correction profile is regarded as the second reflection position so as to calculate the second optical path distance.

4. The attachment angle measuring device as set forth in claim 1, wherein the attachment angle calculation part calculates the attachment angle θ between the axle carrier and the absorber by substituting a difference ΔH between the distance between the axis of the fixed axle carrier and the first light projecting part and the distance between the axis of the fixed axle carrier and the second light projecting part and the first optical path distance L1 and the second optical path distance L2 for a below Numerical Formula 1.

$$\theta = \tan^{-1}\left(\frac{\Delta H}{L2 - L1}\right).$$ [Numerical Formula 1]

5. The attachment angle measuring device as set forth in claim 1, further comprising an axle carrier fixation part detachably fixing the axle carrier to the measurement position.

6. The attachment angle measuring device as set forth in claim 5, further comprising an absorber fixation part detachably fixing the absorber at a position at which the absorber can be attached to the axle carrier fixed by the axle carrier fixation part.

7. The attachment angle measuring device as set forth in claim 6, wherein the absorber fixation part fixes the absorber at a posture at which the attachment angle between the axle carrier fixed by the axle carrier fixation part and the absorber is within a predetermined angular range.

8. An attachment angle measuring method measuring an attachment angle between an axle carrier rotatably supporting a wheel and an absorber comprising an absorber main body attached to the axle carrier and an absorber rod slidably inserted into the absorber main body, comprising:
   a fixing process in which the axle carrier to which the absorber is attached is fixed at a measurement position set previously;
   a first light projecting and receiving process in which the absorber attached to the axle carrier fixed at the measurement position is kept not contacting anything except the axle carrier, and a light is projected to a first reflection position on an outer peripheral surface of the absorber rod of the absorber and the reflected light from the first reflection position is received;
   a second light projecting and receiving process in which the absorber attached to the axle carrier fixed at the measurement position is kept not contacting anything except the axle carrier, and a light is projected to a second reflection position on an outer peripheral surface of the absorber rod of the absorber different from the first reflection position and the reflected light from the second reflection position is received;
   a first optical path distance calculating process which calculates the first optical path distance between the projection start position in the first light projecting and receiving process and the first reflection position based on the reflected light received in the first light projecting and receiving process;
   a second optical path distance calculating process which calculates the second optical path distance between the projection start position in the second light projecting and receiving process and the second reflection position based on the reflected light received in the second light projecting and receiving process; and an attachment angle calculating process in which the attachment angle between the axle carrier and the absorber is calculated based on the first optical path distance and the second optical path distance.

9. The attachment angle measuring method as set forth in claim 8, wherein in each of the first light projecting and receiving process and the second light projecting and receiving process, a slit light is projected to the absorber rod, in the first optical path distance calculating process, a first profile of the outer peripheral surface of the absorber rod is generated based on the reflected light received in the first light projecting and receiving process and a point which is the closest to the projection start position in the first light projecting and receiving process on the first profile is regarded as the first reflection position so as to calculate the first optical path distance, and in the second optical path distance calculating process, a second profile of the outer peripheral surface of the absorber rod is generated based on the reflected light received in the second light projecting and receiving process and a point which is the closest to the projection start position in the second light projecting and receiving process on the second profile is regarded as the second reflection position so as to calculate the second optical path distance.

10. The attachment angle measuring method as set forth in claim 9, wherein in the first optical path distance calculating process, a first correction profile is generated by correcting the first profile as a circular arc or an elliptical arc, and a point which is the closest to the projection start position in the first light projecting and receiving process on the first correction profile is regarded as the first reflection position so as to calculate the first optical path distance, and in the second optical path distance calculating process, a second correction profile is generated by correcting the second profile as a circular arc or an elliptical arc, and a point which is the closest to the projection start position in the second light projecting and receiving process on the second correction profile is regarded as the second reflection position so as to calculate the second optical path distance.

11. The attachment angle measuring method as set forth in claim 8, wherein in the attachment angle calculating process, the attachment angle between the axle carrier and the absorber is calculated by substituting the difference ΔH between the distance between the axis of the axle carrier fixed at the measurement position and the projection start position in the first light projecting and receiving process and the distance between the axis of the axle carrier fixed at the measurement position and the projection start position in the second light projecting and receiving process and the first optical path distance L1 and the second optical path distance L2 for a below Numerical Formula 1.

$$\theta = \tan^{-1}\left(\frac{\Delta H}{L2 - L1}\right).$$ [Numerical Formula 1]

12. The attachment angle measuring method as set forth in claim 8, wherein the fixing process comprises:

an axle carrier fixing process in which the axle carrier is fixed at the measurement position; and an absorber attaching process in which the absorber is attached to the axle carrier fixed at the measurement position in the axle carrier fixing process.

\* \* \* \* \*

UNITED STATES PATENT AND TRADEMARK OFFICE
CERTIFICATE OF CORRECTION

PATENT NO. : 8,009,282 B2
APPLICATION NO. : 12/520011
DATED : August 30, 2011
INVENTOR(S) : Shinji Tohyama et al.

It is certified that error appears in the above-identified patent and that said Letters Patent is hereby corrected as shown below:

| Column | Line | |
|--------|------|---|
| 20 | 32 | After "angle" insert --$\theta$--. |

Signed and Sealed this
First Day of May, 2012

David J. Kappos
*Director of the United States Patent and Trademark Office*